(No Model.)

J. B. DEEDS & E. DAWSON.
PISTON OR VALVE ROD PACKING.

No. 370,934. Patented Oct. 4, 1887.

WITNESSES
Phil C. Dietrich.
Curtis Zimmond.

INVENTORS
John B. Deeds and
Edward Dawson
By E. Everett Ellis, Attorney

N. PETERS, Photo-Lithographer, Washington, D. C.

UNITED STATES PATENT OFFICE.

JOHN B. DEEDS AND EDWARD DAWSON, OF TERRE HAUTE, INDIANA, ASSIGNORS TO LEVI SHULTZ, OF SAME PLACE.

PISTON OR VALVE ROD PACKING.

SPECIFICATION forming part of Letters Patent No. 370,934, dated October 4, 1887.

Application filed May 3, 1887. Serial No. 236,932. (No model.)

*To all whom it may concern:*

Be it known that we, JOHN B. DEEDS and EDWARD DAWSON, citizens of the United States, residing at Terre Haute, in the county of Vigo and State of Indiana, have invented certain new and useful Improvements in Piston or Valve Rod Packing for Engines and Pumps; and we do hereby declare the following to be a full, clear, and exact description of the invention, such as will enable others skilled in the art to which it appertains to make and use the same.

This invention relates to certain new and useful improvements in piston or valve rod packing for engines, pumps, and similar uses; and it consists, substantially, in such features of construction, arrangement, and combinations of parts as will hereinafter be more particularly described, and pointed out in the claim.

The invention has for its object to provide a simplified form of anti-friction packing which shall effectually prevent wear or cutting of the rod on which employed, by which, also, leakage is prevented; and a further object is to prevent accumulation of rust on the rod—a trouble frequently experienced and not prevented by many like inventions heretofore patented.

Finally, the invention has such other objects in view as will appear from the description hereinafter following, when taken in connection with the accompanying drawings, wherein—

Figure 1:
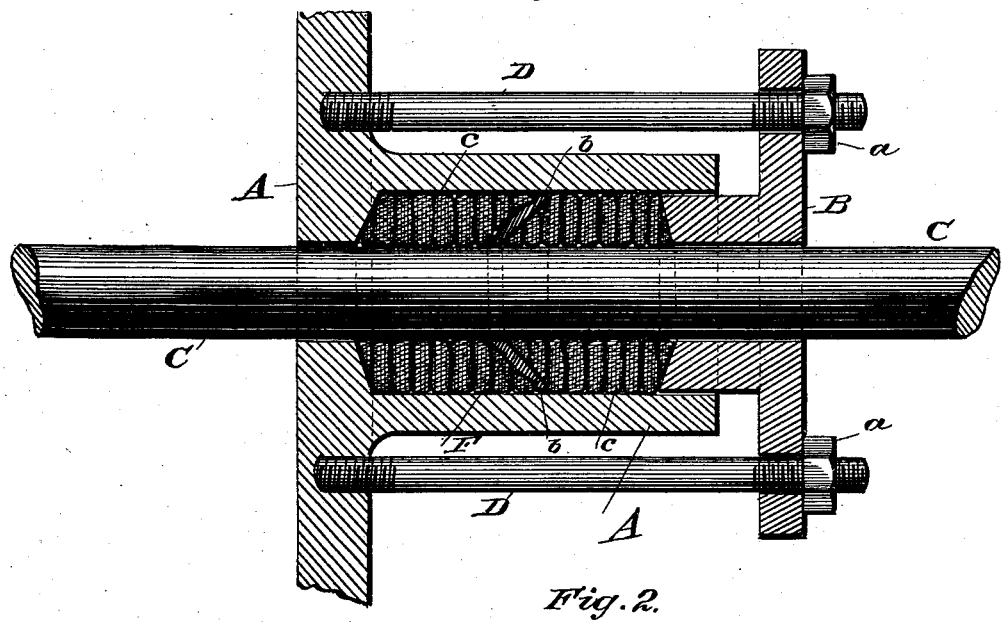
Figure 2:
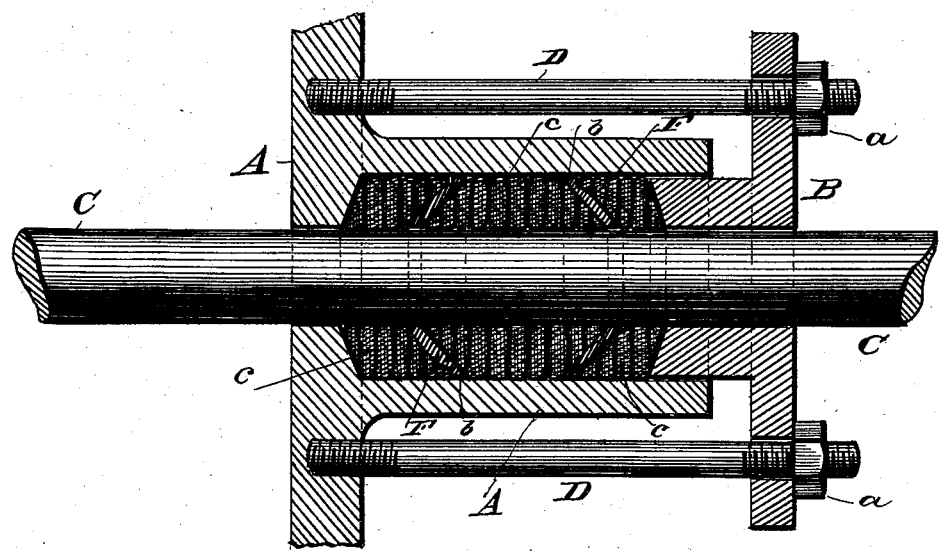
Figures 3, 4:
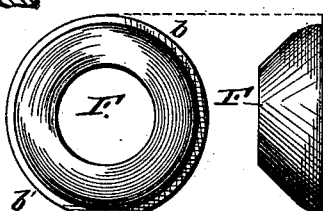

Figure 1 represents a longitudinal sectional view of a stuffing-box and its gland, showing our improved packing in connection therewith; and Fig. 2 represents a similar view of a modification; and Figs. 3 and 4 are plan and side views, respectively, showing the form of construction of our improved metallic packing-ring.

Reference being had to the several parts by the letters marked thereon, A represents a stuffing-box; B, its gland or follower; C, the valve or piston rod, and D D stud-bolts having nuts *a* for adjusting the gland or follower within the box, all of the said parts being of the ordinary or well-known construction, the rod of course working back and forth or reciprocating through the box and gland centrally thereof.

In carrying our invention into effect we employ either one packing-ring of our improved form, as shown by Fig. 1, or two of such rings, as indicated by Fig. 2. The ring itself is of slightly-conical form, having a central circular aperture for the passage of the piston or valve rod, which latter it snugly fits, and surrounding the same at its greater circumference is a small flange, *b*, for a purpose to be described; and it may be also stated that the widest extremity of said ring or rings is designed to closely fit the interior of the stuffing-box. This ring F is placed within the stuffing-box about centrally, or rather, it should be said, is placed upon the valve or piston rod, and then to each side thereof is coiled or wound strips of hemp or rope *c*, which have previously been soaked or impregnated with plumbago or black-lead, and then these are inserted into the stuffing-box from its larger end, and the follower then slipped over the rod and adjusted within the box in such manner as to tightly compress the saturated rope or hemp on each side of the ring. When two rings are employed, they are arranged reversely to each other, as shown in Fig. 2, with the rope or hemp arranged intermediate between the two and to the outer sides of each, as shown. It will thus be seen that in the movements of the rod the hemp will be alternately wedged between the ring or rings and the ends or sides of the stuffing-box and that the rod will thus be protected from wear and leakage prevented. It will also be apparent that the follower can be adjusted from time to time in such manner as to keep the hemp or rope compact on each side of the ring or rings, the said ring or rings acting, in the manner of a wedge, in securely maintaining tightness at each stroke of the rod.

The annular flange formed with the ring prevents the hemp or rope from slipping up over the ring from without, while the hollow interior of said ring admits of the reception therein of several coils of said hemp or rope, and the effectiveness of our improved packing will be apparent, it is thought.

Having thus described our invention, what we claim as new, and desire to secure by Letters Patent, is—

The combination, with the stuffing-box, the rod, and adjustable gland or follower, of one or more metallic packing-rings snugly fitting the rod and interior of the box, and coils of rope surrounding the rod on opposite sides of said ring or rings, such rings being formed with an annular flange on the edge adjacent to the box, substantially as described.

In testimony whereof we affix our signatures in presence of two witnesses.

JOHN B. DEEDS.
EDWARD DAWSON.

Witnesses:
W. A. McFARLAND,
FRED. A. ROSS.